US012572792B2

(12) United States Patent
Wang et al.

(10) Patent No.: US 12,572,792 B2
(45) Date of Patent: Mar. 10, 2026

(54) GOAL-SEEK ANALYSIS WITH SPATIAL-TEMPORAL DATA

(71) Applicant: International Business Machines Corporation, Armonk, NY (US)

(72) Inventors: Rui Wang, Xian (CN); Jing James Xu, Xian (CN); Xiao Ming Ma, Xian (CN); Si Er Han, Xian (CN); Lei Gao, Xian (CN)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 17/066,495

(22) Filed: Oct. 9, 2020

(65) Prior Publication Data

US 2022/0114434 A1    Apr. 14, 2022

(51) Int. Cl.
*G06N 3/08* (2023.01)

(52) U.S. Cl.
CPC ..................................... *G06N 3/08* (2013.01)

(58) Field of Classification Search
None
See application file for complete search history.

(56) References Cited

U.S. PATENT DOCUMENTS

| 7,788,200 | B2 | 8/2010 | Crivat |
| 8,014,983 | B2 | 9/2011 | Crowe |

| 8,542,916 | B2 | 9/2013 | Tognoli |
| 2016/0379388 | A1* | 12/2016 | Rasco ..................... G06Q 10/04 |
| | | | 715/753 |
| 2018/0053093 | A1* | 2/2018 | Olabiyi ............. B60W 50/0097 |
| 2018/0158079 | A1 | 6/2018 | Chu |
| 2018/0341695 | A1* | 11/2018 | Goeser ................ G06F 16/2365 |
| 2021/0374502 | A1* | 12/2021 | Roth ......................... G06N 3/08 |

OTHER PUBLICATIONS

"Dropout Layer," Keras (Year: 2023).*
"Adapt_Definition_Meaning," Merriam-Webster (Year: 2023).*
"Differentiable Sparsification for Deep Neural Networks," Yognjin Lee, arXiv, Electronics and Telecommunications Research Institute (Year: 2019).*
"Dropout Regularization in Hierarchical Mixture of Experts," arXiv, Irsoy et al; Irsoy, 2018. (Year: 2018).*
"Hierarchical Clustering with Prior Knowledge," arXiv, Ma et al; Ma (Year: 2018).*
"Spatiotemporal clustering: A survey," Ansari et al; Ansari, Artificial Intelligence Review (2020) 53:2381-2423 (Year: 2020).*
"Dropout Regularization in Hierarchical Mixture of Experts," arXiv, Irsoy et al; Irsoy (Year: 2018).*
Mell et al., "The NIST Definition of Cloud Computing", Recommendations of the National Institute of Standards and Technology, Special Publication 800-145, Sep. 2011, 7 pages.

* cited by examiner

*Primary Examiner* — Michael J Huntley
*Assistant Examiner* — Paul J Breene
(74) *Attorney, Agent, or Firm* — David K. Mattheis

(57) ABSTRACT

Performing a goal-seek analysis of spatial-temporal data by generating a hierarchical cluster according to spatial temporal data, determining a spatial-temporal location input for a target, determining spatial-temporal predictor values for the spatial-temporal location, and adjusting the hierarchical cluster according to and the spatial-temporal predictors.

20 Claims, 6 Drawing Sheets

Fig. 1

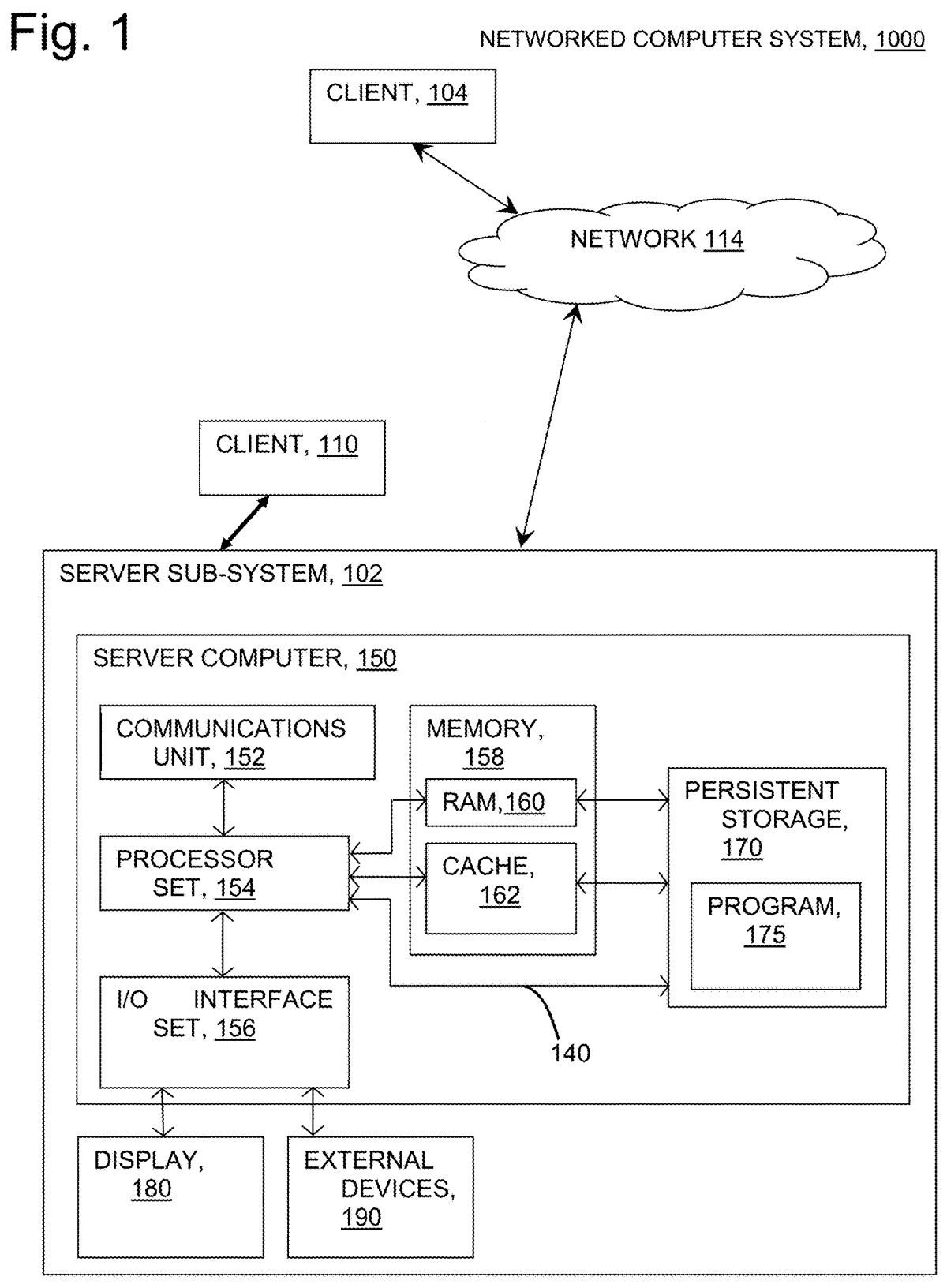

NETWORKED COMPUTER SYSTEM, 1000

CLIENT, 104

NETWORK 114

CLIENT, 110

SERVER SUB-SYSTEM, 102

SERVER COMPUTER, 150

COMMUNICATIONS UNIT, 152

MEMORY, 158

RAM, 160

CACHE, 162

PROCESSOR SET, 154

PERSISTENT STORAGE, 170

PROGRAM, 175

I/O INTERFACE SET, 156

140

DISPLAY, 180

EXTERNAL DEVICES, 190

200

300

400

GOAL-SEEK ANALYSIS WITH SPATIAL-TEMPORAL DATA

BACKGROUND

The disclosure relates generally to goal-seek analysis using spatial-temporal data. The disclosure relates particularly to using spatial-temporal predictions to determine target (goal) generating inputs.

Goal-seek analysis determines the input values necessary to achieve a target goal—for example, the actions needed today across entities and geographies to improve tomorrow's air quality, or the actions needed today across a data center's activities and components to improve the data center's power usage effectiveness tomorrow.

Spatial-temporal data from sources such as Internet of Things connected sensors, provides information relating to sensor readings at specific locations at specific times across a time span.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the use of spatial-temporal data for goal-seek analysis.

Aspects of the invention disclose methods, systems and computer readable media associated with goal-seek analysis of spatial-temporal data by generating a hierarchical cluster according to spatial temporal data, determining a spatial-temporal location input for a target, determining spatial-temporal predictor values for the spatial-temporal location, and adjusting the hierarchical cluster according to and the spatial-temporal predictors.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 1 provides a schematic illustration of a computing environment, according to an embodiment of the invention.

DETAILED DESCRIPTION

Figure 2:
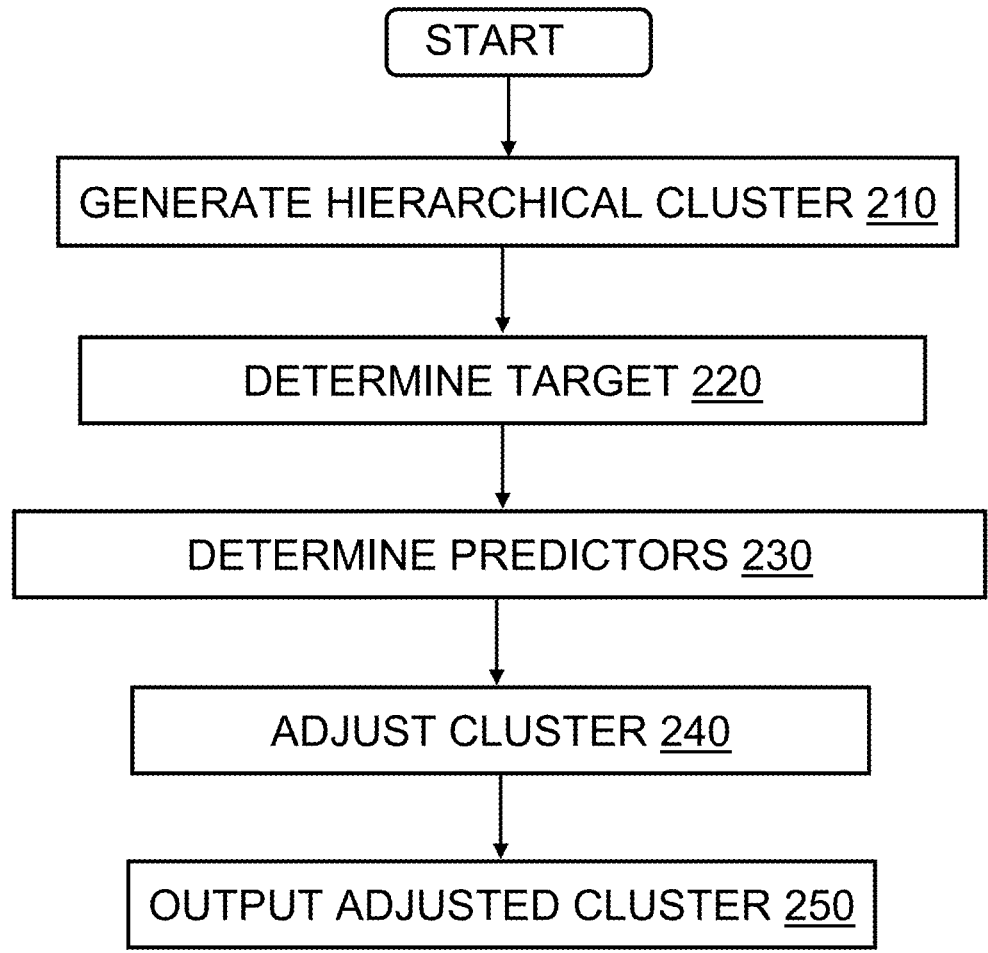
FIG. 2 provides a flowchart depicting an operational sequence, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., generating a hierarchical cluster according to spatial temporal data, determining a spatial-temporal location input for a target, determining spatial-temporal predictor values for the spatial-temporal location, adjusting the hierarchical cluster according to and the spatial-temporal predictors, etc.). These solutions are not abstract and cannot be performed as a set of mental acts by a human due to the processing capabilities needed to facilitate goal-seek analysis, for example. Further, some of the processes performed may be performed by a specialized computer for carrying out defined tasks related to spatial-temporal based goal-seek analysis.

Goal-seek analysis, or what-if analysis, proceeds by altering assumptions underlying a depiction of a system and determining the effect of the alteration upon the system. Large systems may include thousands or millions of data sources and equally large numbers of outcome predictors, making accurate goal-seek analysis associated with a desired target outcome difficult. Disclosed embodiments enable the determination of location-based activities associated with desired goals by modeling the system using spatial-temporal data, generating a spatial-temporal hierarchical cluster model of the system, analyzing a desired goal in terms of locations most relevant to the goal and location-based adjustable predictors most relevant to advancing the goal through each location. Optimizing locations and predictors associated with the goal and then distributing the optimal values throughout the model yields a depiction of the current system state most likely to yield the desired future system state. Spatial-temporal prediction algorithms enable the prediction of location-based future system states according to models derived from current and past spatial-temporal data sets.

In an embodiment, the method receives spatial-temporal data. The spatial-temporal data set includes data collected over time with each data point also having a location component, such as current and historic system variable data values associated with particular locations and particular times. Examples include Internet of Things sensor data gathered from edge cloud computing network resources; health-care, logistics, traffic, and other data sets associated with geographic locations etc., as well as neuroscience analysis of nervous system functionality.

In this embodiment, the method generates a spatial-temporal model using the spatial-temporal data. The model includes a series of hierarchical layers starting with location-based system states associated with the most recent data and proceeding backward in time according to the relationships between the location-based data values. As an example, the method evaluates the correlations between current system states and previous system states in terms of variable values and sensor locations. The method determines the relative contributions of the data from each location to the current state of each system location. For each layer and location the method self-adjusts the model, removing any association in the current layer between past location data and current location-based data when no correlation between the two is found. For each layer the method self-validates the upward associations of location-based values using drop-out testing of the relationships or similar validation methods. The method utilizes machine learning models such as recurrent neural networks, or long short-term memory networks, to model, evaluate, and self-validate the relationships in the spatial-temporal data set. For each layer, the method self-validates the correlations between the layer clusters and the successive layer clusters and associated location and temporal data characteristics. In an embodiment, the method adds model layers of data clusters according to the self-validation of the previous layer. In this embodiment, a new layer will be added including clusters highly correlated to the clusters of a preceding layer when the self-validation of the previous layer indicates a high-level of correlation between the clusters of the layer and the associated clusters of the next layer up in the hierarchy. A new layer will not be added when the correlation of the clusters of the preceding layer to the associated clusters of the next layer up of the hierarchy, or to the clusters of the target, falls below a threshold e.g., 50% correlation to the target. For the new layer, only clusters which self-validate as having correlation to the previously layer in excess of the threshold are retained in the layer.

After generating a broad model from the spatial-temporal data, the method clusters the model using defined target locations and desired outcomes. For any target or outcome, the method clusters the data from the set of model layers associated with the target. Multiple targets and sets of targets, as well as sets of desired outcomes, may be provided as an input for the goal-seek analysis using the derived spatial-temporal model. Examples include, improve freeway traffic in Chicago, improve data center energy utilization in the United Kingdom, etc.

In generating the hierarchical cluster model from the broad model, the method generates one or more adaptive layers of locations. The method generates each successive layer according to the broad model and the desired outcome. The set of model layers adapts to changes in desired outcomes as well as changes in the higher layers of the cluster. Changes to an outcome result in the generation of a new location most relevant to that outcome and each succeeding layer adapts to changes associated with the preceding layer. The model may include multiple adaptive layers enabling changes to the model according to changes in desired outcomes. For example, the relevant locations for a first goal may differ from the most relevant locations for a second goal. Upon receiving the new desired outcome, the layers of the method adapt, adding or removing layer locations as needed to present the most relevant locations in each layer of the revised model. The method adds layers to the model until the correlation of the clusters of the preceding layer to the associated clusters of the next layer up of the hierarchy, or to the clusters of the target, falls below a threshold e.g., 50% correlation to the target.

In an embodiment, the method receives desired variable values associated with a generalized system state as an input without regard for particular locations. As an example, the desired goal may be expressed as an overall level of productivity, or system energy use without any specificity to locations.

In an embodiment, the method evaluates a desired goal in terms of the generated model. The method uses the spatial-temporal model in reverse. Rather than using the model to predict a future outcome, the method defines the future outcome which is desired and uses the model to determine what conditions must be present at system locations to yield the desired future outcome.

The method determines the locations of the system most able to contribute to the desired outcome based upon the machine learning analysis of the historic spatial temporal data. The machine learning analysis determines a relevance of each system location to current outcomes enabling the generation of a system hierarchy according to the relative importance of each location to current (and future) outcomes. This first goal-seek analysis identifies the locations most relevant to the goal and clusters the locations of previous layers according to the relevance of locations to these current most relevant locations. Each cluster includes those locations relevant to desired future system states as set forth in the goal.

In this embodiment, the method considers the relevance of each location according to the past contributions made by each location to system states. The method considers the various system state variables, and the ranges of values for those variables at each location and the combination of the location and system state variable value in contributing to a current or future system state. As an example, overall air quality results from a large number of locations and a wide range of system variables. The spatial-temporal model identifies those locations making the largest current and past contribution to air quality as well as the nature of that contribution—overall as well as specific emissions. The method may determine a location has low overall emissions but high levels of a particular emission, resulting in identification of that location as a prime location for achieving an air quality goal. For example, particular portions of a freeway system may contribute more to traffic issues, particular data centers may utilize a larger share of overall system energy, etc.

Development, or generation, of the hierarchical cluster structure proceeds until one or more defined threshold have been satisfied. Thresholds may be defined in terms of time, the number of location layers or the aggregated relative influence of the structure upon the desired target outcome. For example, the clusters may include all locations having an influence on the target outcome within a day, week, month, etc. The clusters may be limited in terms of location separation from the target location, for example considering only locations within three layers removed from the target locations. The clusters may be limited in terms of aggregated influence upon the target; the model considers the most influential locations for each layer up to an aggregated level of influence of 80% of the total influence upon the location of the next layer.

Using the clusters, the method conducts a goal-seek analysis to determine an optimal set of system influencing locations at time t to yield a desired goal at time t+1. $Y_t=f(t, Y_1, Y_2, Y_3, \ldots, Y_n)$. The method identifies optimal system locations for each layer of the hierarchical cluster model. For the example the hierarchical cluster model includes a top layer with T system location most relevant to achieving the desired outcome, a second layer including those locations most relevant to the T system locations, and so on through the hierarchical cluster model.

For each location of the set of optimal locations, the method conducts goal-seek analysis of the system attributes of each location to determine the optimal set of system attribute values associated with yielding the desired system state of the goal, $Y_i=f_i(X_1, X_2, X_3, \ldots, X_m)$. For example, the method determines the attribute values for the set $Y_i$ for each location T of the top layer of the hierarchical cluster model associated with the current desired outcome, and also the attribute values for the set $Y_i$ for each location of each succeeding layer of the hierarchical cluster model associated with the current desired outcome.

Having determined the optimal set of system locations and the associated system attributes associated with the desired goal, the method distributes the determined values throughout the hierarchical cluster model. The method generates a new (adapted) version of the hierarchical cluster structure using the determined set of locations and the determined set of location-based attributes for each location. The distribution of the determined values yields a current system state associated with achieving the desired outcome. The resulting model provides details relating to activities or conditions specific to each relevant location in terms of system attributes. The resulting model carries the highest likelihood of achieving the desired outcome.

The method utilizes the hierarchical cluster structures derived according to the desired goals to identify those attributes (system variables) which contribute to the influence each location has upon the desired outcome.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise goal-seek analysis program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Processor(s) 154, access spatial-temporal data from memory 158, or from I/O devices 156, and perform the steps of the method to generate a hierarchical model of the associated system and conduct goal-seek analysis to yield the system map most likely to achieve the desired system goals. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the goal-seek analysis program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, a network of internet of things sensors, and/or some other suitable input device. External device(s) 190 can also include portable computer readable storage media such as, for example, thumb drives, portable optical or magnetic disks, and memory cards. Software and data used to practice embodiments of the present invention, e.g., goal-seek analysis program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

FIG. 2 provides a flowchart 200, illustrating exemplary activities associated with the practice of the disclosure. After program start, at block 210, the method of goal-seek analysis program 175 generates a hierarchical cluster model. In an embodiment, the method generates a broad hierarchical cluster model using spatial-temporal data. The method aggregates data according to the correlations between spatial and temporal aspects of the data. Data points having highly correlated spatial, temporal, or combined spatial temporal features are aggregated into clusters. The method further correlates data points along timelines according to the correlation and associated influence the data points have upon subsequent data points.

The method of the goal-seek analysis program 175 generates the hierarchical cluster structure according to defined targets or goals associated with the data set. The hierarchical cluster structure includes layers of spatial-temporal correlated data points further correlated with preceding and successive layers of the model structure. The hierarchical cluster structure further includes system variable attribute data points as part of the spatial temporal data. The attribute data points serve as predictors as the attribute data points influence the values of the succeeding layer of the model to a greater or lesser degree. Attributes having greater influence are maintained in the structure while attributes having little or no influence upon the succeeding layer are ignored or removed from the layer. In an embodiment, the method uses a machine learning model, such as a recurrent neural network, or long-short-term memory network to evaluate the spatial-temporal data and determine the correlations across the spatial and temporal ranges of the data set.

At block 220, the method of goal-seek analysis program 175 determines target locations associated with a defined goal. The method uses the spatial-temporal model of the hierarchical cluster structure in reverse. The method defines the future state and uses the model to determine the location inputs necessary at each layer to arrive at the defined target output. This goal-seeking analysis of the data evaluates locations at each layer using a what-if analysis, or Monte Carlo simulations to identify the locations in terms of their relative contribution to achieving the desired outcome. The method optimizes the set of locations to yield the set of locations most likely to yield the desired goal.

At block 230, the method of goal-seek analysis program 175 determines the system attribute predictor values associated with the set of locations from block 220. The method uses a reverse process to again determine what predictor values are needed at the identified locations to achieve the goal. The method optimizes the system attribute predictor values for each location, yielding a set of predictor values for each of the locations. The overall set of predictor values is optimized to have the highest likelihood of achieving the goal in association with the set of optimized locations. The method evaluates predictor values using what-if, or Monte Carlo simulations to alter the values of each predictor across the range of possible values for the predictor for each location. The method evaluates the results of each simulation with regard to achieving the goal. The method seeks the set of predictor values having the highest likelihood of achieving the goal.

At block 240, the method adjusts the hierarchical cluster model using the locations and predictors determined in the optimizations of blocks 220 and 230. The adjusted cluster model provides a system view including the system attribute values and associated system locations most likely to yield the desired system target. For each of the optimized locations the adjusted cluster model provides the system attribute values associated with achieving the desired goal. In an embodiment, the adjusted cluster model includes ranges of system attribute values for one or more of the locations together with the probable impact values across the range will have upon the likelihood of achieving the goal or the extent to which the goal will be achieved.

At block 250, the method provides an output including the hierarchical cluster structure adjusted to include the optimized location and system attribute values. The output provides a roadmap for achieving the desired system goal in terms of necessary system attributes associated with each relevant location.

Figure 3:
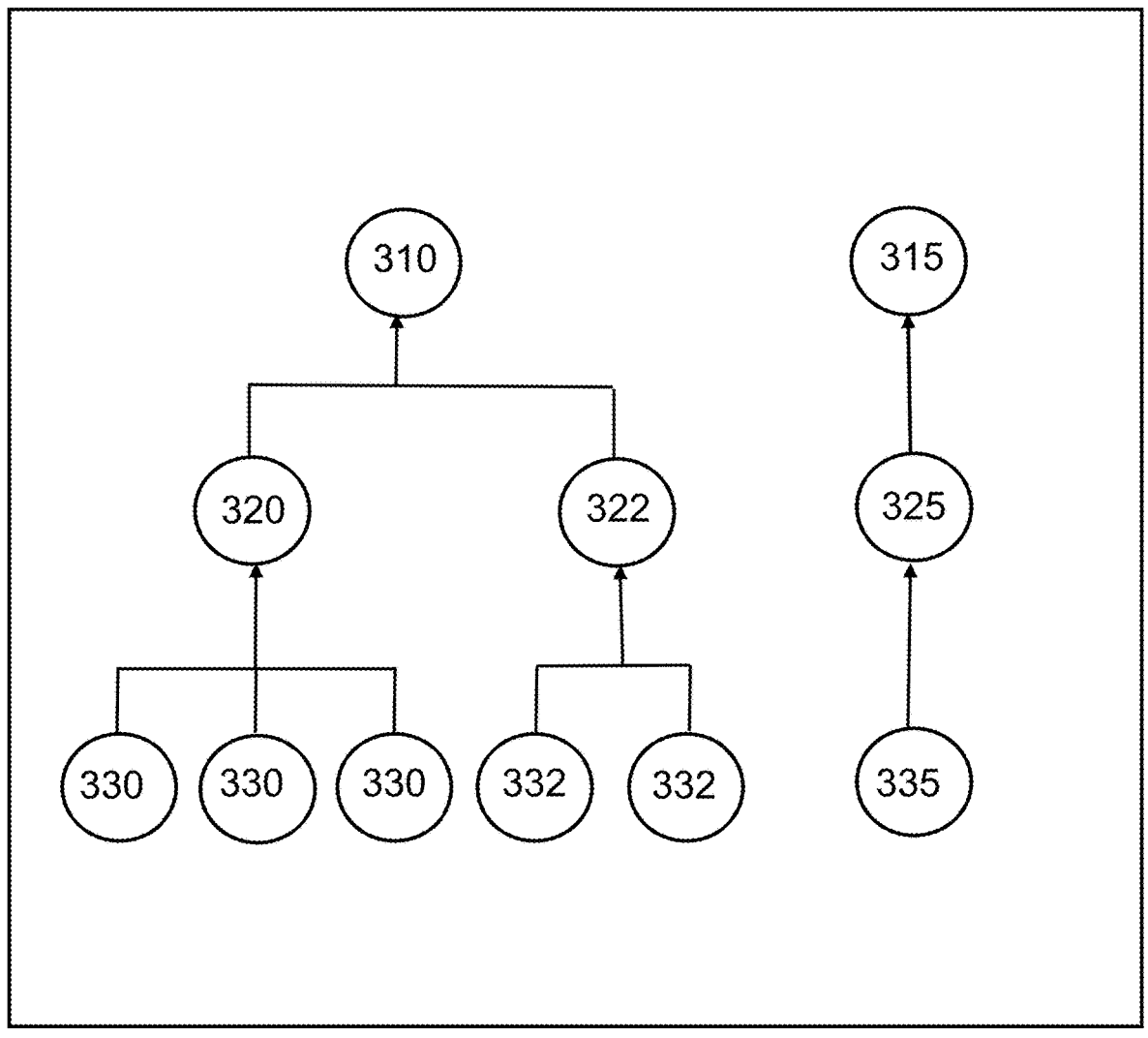
FIG. 3 depicts a model structure and data flow, according to an embodiment of the invention.

FIG. 3 provides an illustration 300, of a hierarchical cluster structure generated by the method of goal-seek analysis program 175. As shown in the figure, clusters of spatial-temporal data points, items 310-335, are mapped according to the relationships between the clusters. Each cluster includes data points having highly correlated spatial, temporal or combined spatial-temporal data characteristics. The figure shows the hierarchical relationship between clusters of different layers. The layers may be defined according to a timeline, moving from the oldest data clusters at the bottom of the figure to the newest data clusters at the top.

FIG. 3 shows the aggregation of data along the timeline. In the bottom layer, the method aggregates system attribute predictors into clusters correlated according to spatial-temporal characteristics of the data. Clusters may include data highly correlated according to location, according to time of occurrence, or both. The method aggregates predictors 330 into cluster 320, predictors 332 into cluster 322, and predictor 335 into cluster 325. The method aggregates clusters 320 and 322 into cluster 310, and cluster 325 into cluster 315. The structure of the model provides a model for predicting future spatial-temporal points in the modeled space according to the aggregated predictors and clusters influencing each cluster and location of the structure. The method aggregates the elements of each layer according to the correlation of those elements to the elements of the next layer up in the hierarchy.

Figure 4:
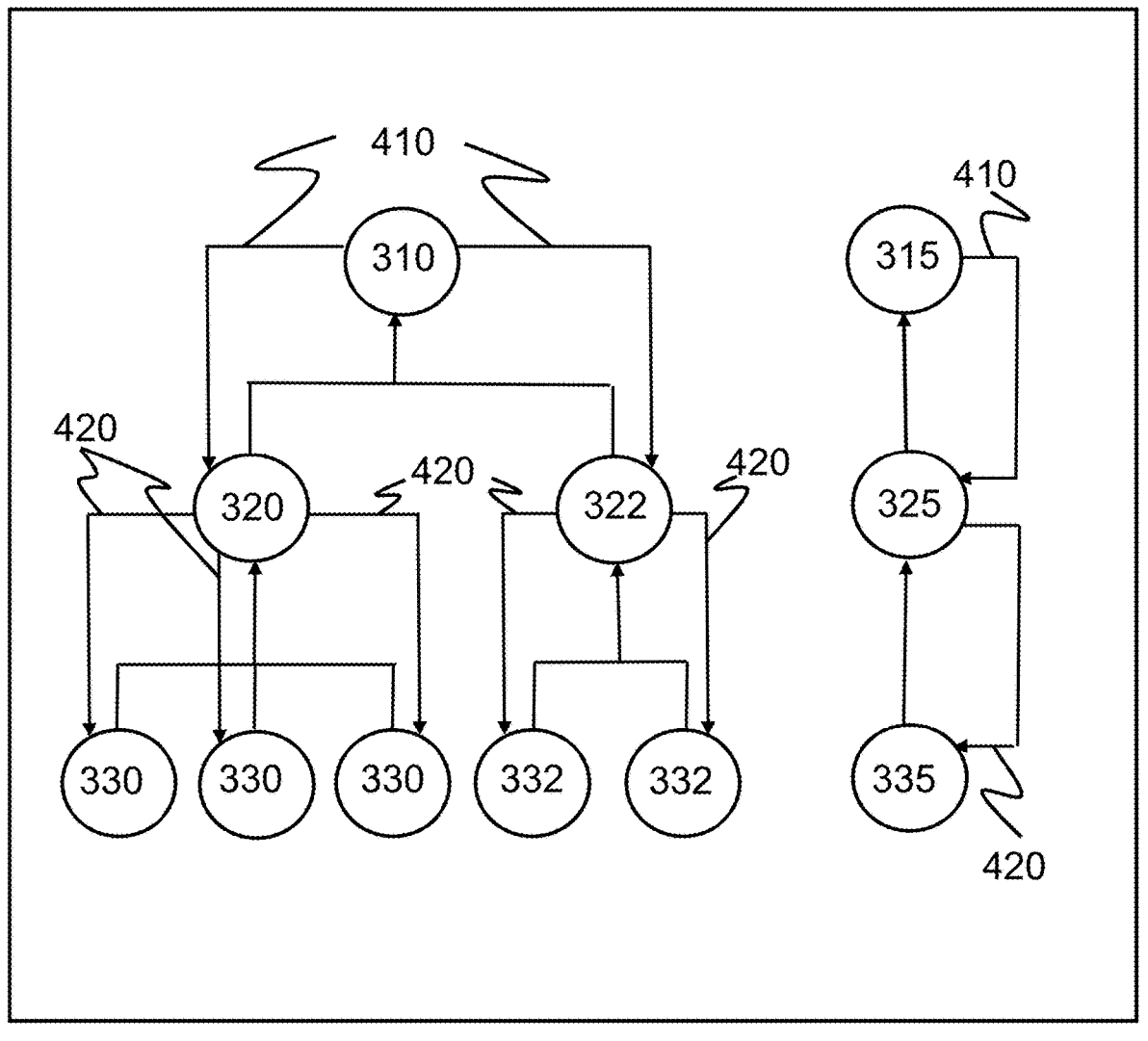
FIG. 4 depicts a model structure and data flow, according to an embodiment of the invention.

FIG. 4 provides an illustration 400, of data flows associated with adjusting the hierarchical cluster structure. The adjustment occurs after the goal-seek analysis and identification of optimized target locations and system attribute predictor values associated with the defined system goals. As shown in the figure, data associated with the optimized target locations and system attribute predictors flows from the upper layer to the middle layer, items 410. The data flow relates to adjusting the middle layer, refining the clusters of the layer to those correlated with the optimized locations identified by the method. Data associated with the optimized locations and predictors flows from the middle layer to the bottom layer, items 420. This data flow relates to refining the location and predictor values for each identified location to those predictor values identified in the optimization steps described above. The result provides a system model mapped with the system locations and system attribute predictor values necessary to arrive at the desired system goal as an output.

Implementation models for the disclosed systems and method include the use of edge cloud and cloud network resources to provide close-coupled computing resources to internet of things sensor networks as well as to provide the necessary computing environment resources for hierarchical cluster structure development and goal-seek analysis using the structure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
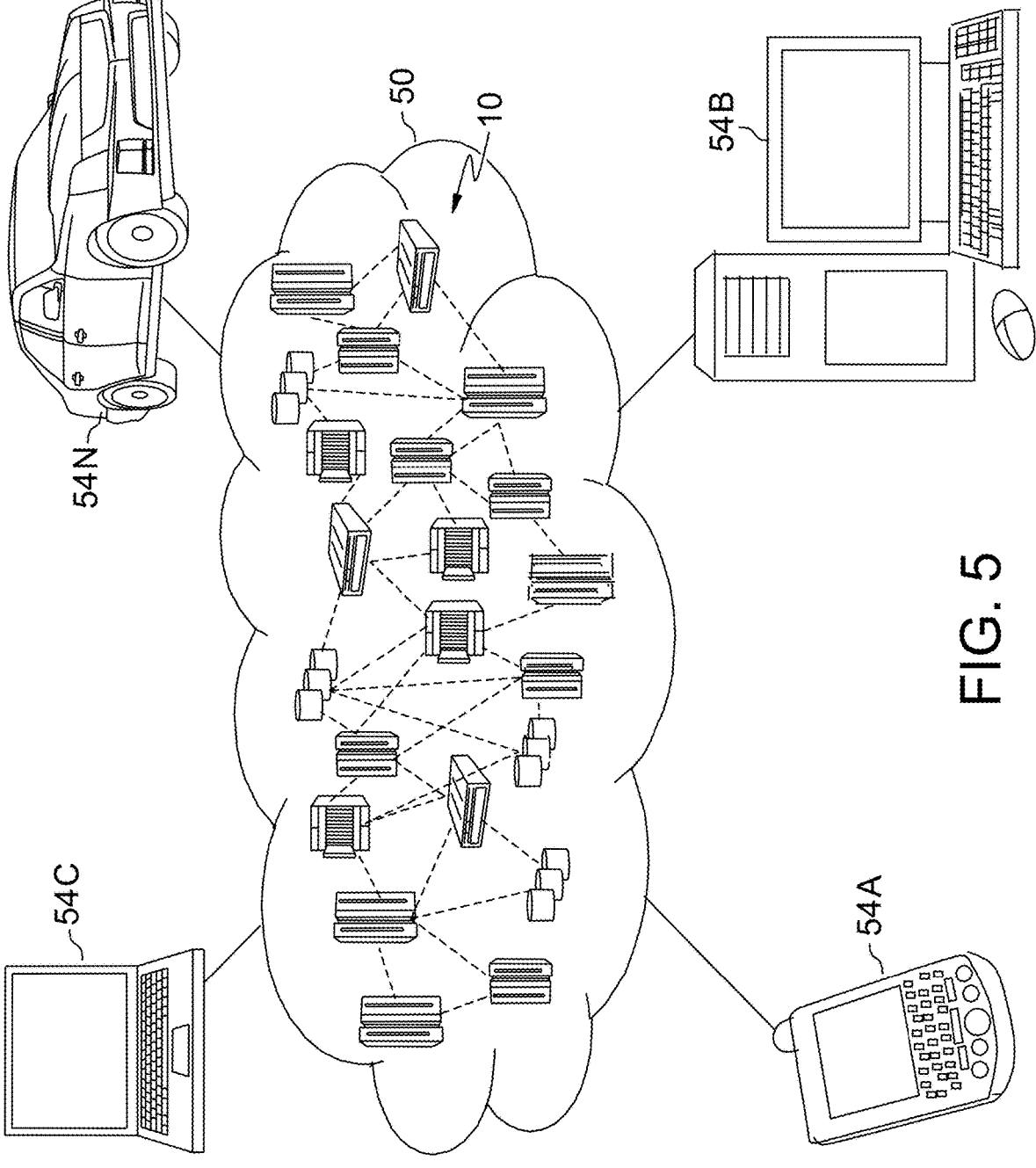
FIG. 5 depicts a cloud computing environment, according to an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
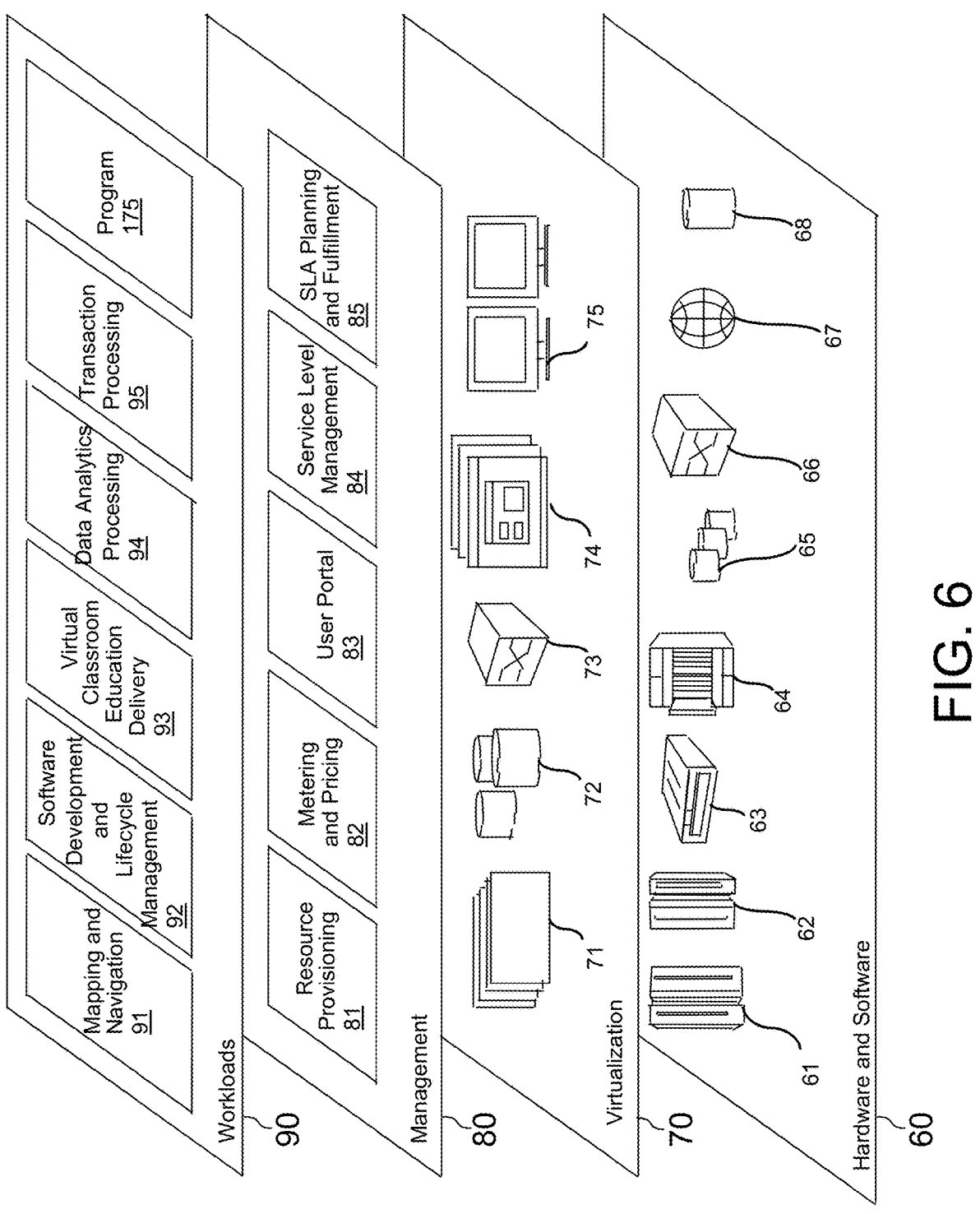
FIG. 6 depicts abstraction model layers, according to an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and goal-seek analysis program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for goal-seek analysis of spatial-temporal data, the method comprising:

receiving spatial-temporal data including data collected over time and having a location component from system sensors over a network;

generating a spatial-temporal machine learning model comprising hierarchical layers from the spatial-temporal data by:

generating a series of hierarchical layers using the spatial-temporal data;

evaluating correlations between current system states and previous system states in terms of spatial-temporal variable values and sensor locations;

determining the relative contributions of the spatial-temporal data from each location to the current state of each system location;

removing any association in a current hierarchical layer between past location-based data and current location-based data when no correlation between the two is found;

self-validating by a machine learning model an upward association of location-based data using drop-out testing of the correlations;

self-validating by the machine learning model correlations between first layer clusters and successive layer clusters and correlations between associated location data and temporal data characteristics; and adding a new hierarchical layer including clusters highly correlated to clusters of a preceding layer above any layer wherein the self-validation of the layer indicates a high-level of correlation between the clusters of the layer and the associated clusters of a next layer up in the hierarchy;

generating, by one or more computer processors, a hierarchical cluster structure for a target according to the spatial-temporal model:

determining, by the one or more computer processors, a spatial-temporal location input for the target;

determining, by the one or more computer processors, spatial-temporal predictor values for the spatial-temporal location;

adjusting, by the one or more computer processors, the hierarchical cluster structure according to the spatial-temporal predictors; and providing, by the one or more computer processors over the network, a system model mapped with the spatial-temporal location input and the spatial-temporal predictor values.

2. The computer implemented method according to claim 1, wherein determining the spatial-temporal location input for the target includes conducting a goal-seek analysis using the hierarchical cluster structure.

3. The computer implemented method according to claim 1, wherein the hierarchical cluster structure comprises an adaptive layer.

4. The computer implemented method according to claim 1, wherein the hierarchical cluster structure comprises multiple adaptive layers.

5. The computer implemented method according to claim 1, further comprising adding, by the one or more computer processors, hierarchical cluster layers to the hierarchical cluster structure according to layer self-validation with the target.

6. The computer implemented method according to claim 1, wherein determining the spatial-temporal predictor values for the spatial-temporal location includes conducting goal-seek analysis using the hierarchical cluster structure.

7. The computer implemented method according to claim 1, further comprising:

determining, by the one or more computer processors, spatial-temporal inputs for the target by conducting a goal-seek analysis using the hierarchical cluster structure, wherein the hierarchical cluster structure comprises an adaptive layer;

adding, by the one or more computer processors, hierarchical cluster structure layers according to layer self-validation with the target; and wherein determining spatial-temporal predictor values for the spatial-temporal location includes conducting goal-seek analysis using the hierarchical cluster structure.

8. A computer program product for goal-seek analysis of spatial-temporal data, the computer program product comprising one or more computer readable storage devices and collectively stored program instructions on the one or more computer readable storage devices, the stored program instructions comprising:

program instructions to receive spatial-temporal data including data collected over time and having a location component from system sensors over a network;

program instructions to generate a spatial-temporal machine learning model comprising hierarchical layers from the spatial-temporal data by:

generating a series of hierarchical layers using the spatial-temporal data;

evaluating correlations between current system states and previous system states in terms of spatial-temporal variable values and sensor locations;

determining the relative contributions of the spatial-temporal data from each location to the current state of each system location;

removing any association in a current hierarchical layer between past location-based data and current location-based data when no correlation between the two is found;

self-validating by a machine learning model, an upward association of location-based data using drop-out testing of the correlations;

self-validating by the machine learning model, correlations between first layer clusters and successive layer clusters and correlations between associated location data and temporal data characteristics; and adding a new hierarchical layer including clusters highly correlated to clusters of a preceding layer above any layer wherein the self-validation of the layer indicates a high-level of correlation between the clusters of the layer and the associated clusters of a next layer up in the hierarchy;

program instructions to generate a hierarchical cluster structure for a target according to the spatial temporal model;

program instructions to determine a spatial-temporal location input for the target;

program instructions to determine spatial-temporal predictor values for the spatial-temporal location;

program instructions to adjust the hierarchical cluster structure according to the spatial-temporal predictors; and program instructions to provide a system model mapped with the spatial-temporal location input and the spatial-temporal predictor values over the network.

9. The computer program product according to claim 8, wherein determining the spatial-temporal location input for the target includes:

conducting a goal-seek analysis using the hierarchical cluster structure.

10. The computer program product according to claim 8, wherein the hierarchical cluster structure comprises an adaptive layer.

11. The computer program product according to claim 8, wherein the hierarchical cluster structure comprises multiple adaptive layers.

12. The computer program product according to claim 8, the stored program instructions further comprising program instructions to add hierarchical cluster layers to the hierarchical cluster structure according to layer self-validation with the target.

13. The computer program product according to claim 8, wherein determining spatial-temporal predictor values for the spatial-temporal location includes:

conducting a goal-seek analysis using the hierarchical cluster structure.

14. The computer program product according to claim 8, the stored program instructions further comprising:

program instructions to determine spatial-temporal inputs for the target by conducting a goal-seek analysis using the hierarchical cluster structure, wherein the hierarchical cluster structure comprises an adaptive layer;

program instructions to add hierarchical cluster layers to the hierarchical cluster structure according to layer self-validation with the target; and program instructions to determine spatial-temporal predictor values for the spatial-temporal location by conducting goal-seek analysis using the hierarchical cluster structure.

15. A computer system for goal-seek analysis of spatial-temporal data, the computer system comprising:

one or more computer processors;

one or more computer readable storage devices; and stored program instructions on the one or more computer readable storage devices for execution by the one or more computer processors, the stored program instructions comprising:

program instructions to receive spatial-temporal data including data collected over time and having a location component from system sensors over a network;

program instructions to generate a spatial-temporal machine learning model comprising hierarchical layers from the spatial-temporal data by:

generating a series of hierarchical layers using the spatial-temporal data;

evaluating correlations between current system states and previous system states in terms of spatial-temporal variable values and sensor locations;

determining the relative contributions of the spatial-temporal data from each location to the current state of each system location;

removing any association in a current hierarchical layer between past location-based data and current location-based data when no correlation between the two is found;

self-validating by a machine learning model an upward associations of location-based data using drop-out testing of the correlations;

self-validating by the machine learning model correlations between first layer clusters and successive layer clusters and correlations between associated location data and temporal data characteristics; and adding a new hierarchical layer including clusters highly correlated to clusters of a preceding layer above any layer wherein the self-validation of the layer indicates a high-level of correlation between the clusters of the layer and the associated clusters of a next layer up in the hierarchy;

program instructions to generate a hierarchical cluster structure for a target according to the spatial temporal model;

program instructions to determine a spatial-temporal location input for the target;

program instructions to determine spatial-temporal predictor values for the spatial-temporal location;

program instructions to adjust the hierarchical cluster structure according to the spatial-temporal predictors; and program instructions to provide a system model mapped with the spatial-temporal location input and the spatial-temporal predictor values over the network.

16. The computer system according to claim 15, wherein determining the spatial-temporal location input for the target includes:

conducting a goal-seek analysis using the hierarchical cluster structure.

17. The computer system according to claim 15, wherein the hierarchical cluster structure comprises an adaptive layer.

18. The computer system according to claim 15, the stored program instructions further comprising program instructions to add hierarchical cluster layers to the hierarchical cluster structure according to layer self-validation with the target.

19. The computer system according to claim 15, wherein determining spatial-temporal predictor values for the spatial-temporal location includes:

conducting a goal-seek analysis using the hierarchical cluster structure.

20. The computer system according to claim 15, the stored program instructions further comprising:

program instructions to determine spatial-temporal inputs for the target by conducting a goal-seek analysis using the hierarchical cluster structure, wherein the hierarchical cluster structure comprises an adaptive layer;

program instructions to add hierarchical cluster layers to the hierarchical cluster structure according to layer self-validation with the target; and program instructions to determine spatial-temporal predictor values for the spatial-temporal location by conducting goal-seek analysis using the hierarchical cluster structure.

\* \* \* \* \*